United States Patent [19]
O'Donnell

[11] Patent Number: 6,032,778
[45] Date of Patent: Mar. 7, 2000

[54] CARGO ROLLER

[76] Inventor: Steven B. O'Donnell, 10702 Hathaway Dr., Santa Fe Springs, Calif. 90670

[21] Appl. No.: 09/205,215

[22] Filed: Dec. 4, 1998

[51] Int. Cl.[7] .................................................. B65G 13/00
[52] U.S. Cl. ........................ 193/37; 29/895.32; 244/137.1
[58] Field of Search ............................. 244/137.1, 137.4; 29/895.32, 895.21, 898.22, 895.3; 193/35, 37

[56] References Cited

U.S. PATENT DOCUMENTS

| | | | |
|---|---|---|---|
| 1,286,343 | 12/1918 | Kendall | 193/37 |
| 3,363,735 | 1/1968 | Hotchkiss | 193/37 |
| 3,559,782 | 2/1971 | Lesley et al. | 193/37 |
| 3,753,541 | 8/1973 | Grueber et al. | 244/137.1 |
| 4,790,421 | 12/1988 | Gorges | 193/37 |
| 5,381,887 | 1/1995 | Emmons | 193/37 |
| 5,548,897 | 8/1996 | Link | 29/895.32 |
| 5,655,642 | 8/1997 | Lawrence et al. | 193/37 |

FOREIGN PATENT DOCUMENTS

| | | | |
|---|---|---|---|
| 489007 | 6/1954 | Italy | 193/37 |

*Primary Examiner*—Galen L. Barefoot
*Attorney, Agent, or Firm*—Edgar W. Averill, Jr.

[57] ABSTRACT

A cargo roller for use in a roller assembly useful in aircraft or other applications where a high strength to weight ratio is important. The cargo roller includes an outer roller surface and an inner surface which includes at least one stiffening ring formed circumferencially in an inner cavity of the roller. A bearing cavity is formed at each end and preferably the entire assembly is formed from a single piece of aluminum or other appropriate material.

10 Claims, 1 Drawing Sheet

CARGO ROLLER

BACKGROUND OF THE INVENTION

The field of the invention is cargo rollers and the invention relates more particularly to cargo rollers widely used in commercial aircraft. A widely used cargo roller assembly is shown in U.S. Pat. No. 3,753,541. Although the roller used in this assembly has been widely accepted, it has been known to break at a position between hub 23 and the stiffening ribs. A broken roller creates a great deal of potential difficulty in moving cargo within the cargo area of an aircraft and, thus, a stronger, yet still lightweight, roller is needed.

BRIEF SUMMARY OF THE INVENTION

The present invention is for a cargo roller for use in a roller assembly useful in aircraft or other applications where high strength to weight ratio is important. The roller has an outer surface, which although generally cylindrical, is preferably slightly crowned. Means are provided for supporting a bearing at each end of the roller and the inner volume of the roller is partially hollowed out to reduce weight. In this hollowed out portion one or more stiffening rings are positioned which are preferably formed of the same material as the body of the roller. Preferably, the roller assembly has bearing cavities at each end with a bearing stop or hub portion which also extends slightly into the inner cavity. Preferably, the inner cavity is slightly crowned to follow the shape of the outer surface of the roller so that the wall thickness is constant along a majority of the width of the roller.

DESCRIPTION OF THE PREFERRED EMBODIMENTS

Figure 1:
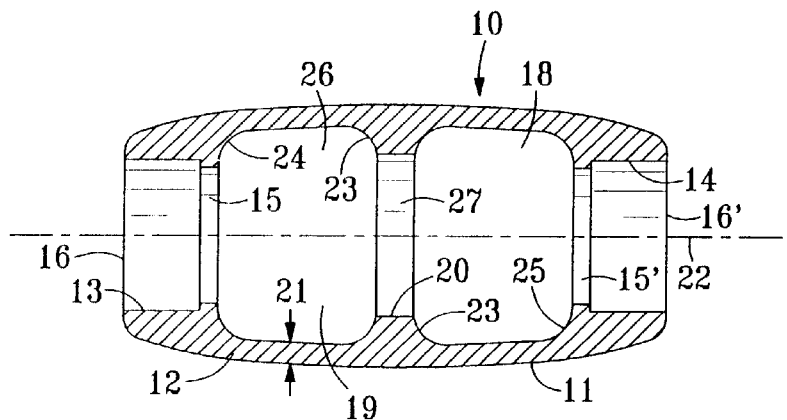
FIG. 1 is a cross-sectional view of the roller of the present invention.
Figure 2:
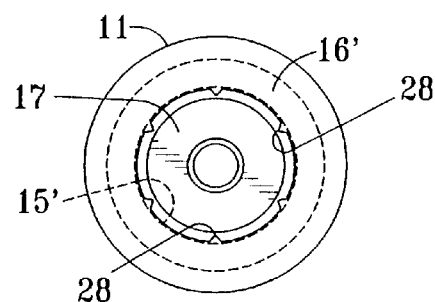
FIG. 2 is an end view of the roller of FIG. 1.
Figure 3:
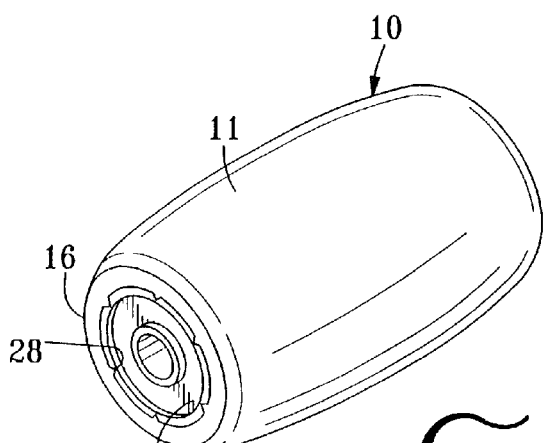
FIG. 3 is a perspective view of the roller of FIG. 1, including a bearing assembly.

The cargo roller shown in U.S. Pat. No. 3,753,541 is strengthened by a series of longitudinal stiffening ribs formed within the inner cavity. Hubs are pressed into each end and secured to the roller by swaging the end portions of the roller. A bearing assembly is then held in the cavity of the hub. The outer surface of the roller is slightly crowned and the inner surface is straight. The inventor's desire was to provide an improved cargo roller which would not have a tendency to break at the inner edge of the hubs 23 and which could be manufactured economically while still having increased strength. The inventor created a shape which is shown best in FIG. 1 of the drawings. The cargo roller is indicated by reference character 10 and has an outer surface 11 of the roller portion 12. First and second bearing cavities 13 and 14 are formed at each end 16 and 16' and preferably include stop rings 15 and 15'. A bearing assembly such as that indicated by reference character 17 in FIG. 2 is pressed into bearing cavity 13 until its inner surface abuts stop ring 15. It is then staked at stake points 28 or otherwise held in the cavity.

The combination of light weight and strength of the cargo roller of the present invention is the result of the shape of the inner hollow inner cavity 18 within the inner volume of the roller. The inner volume is intended to mean the entire volume of the roller within outer surface 11. The hollow inner cavity 18 is formed with at least one stiffening ring 20 which greatly increases the strength of the roller and its ability to withstand shock loads.

Preferably, outer surface 11 is slightly crowned as shown in the drawings and the inner cavity 18 is also slightly crowned so that a wall thickness 21 is constant along a majority of the length of the roller. The roller rotates around a central axis of rotation 22 and the outer surface may be formed in any desired shape as long as any portion of the outer surface forms a circle when viewed in a direction normal to the central axis of rotation 22.

Another important feature of the present invention is its elimination of a hub which thereby forms three areas of maximum thickness in the roller: one around stop ring 15, one around stiffening ring 20 and the third around stop ring 15'. Thus, the areas of weakness of the prior art roller of U.S. Pat. No. 3,753,541 are eliminated.

Preferably, the roller is formed from an aluminum alloy, but of course, other materials of construction may be available which provide improved strength to weight ratios.

A single stiffening ring is shown in the drawings, but it is within the purview of the present invention that two or more stiffening rings can be made. Preferably, the stiffening ring 20 has a fillet, such as fillet 23. Also, fillets 24 and 25 are preferred adjacent the stop rings 15 and 15'.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A cargo roller for use in a roller assembly useful in aircraft or other applications where high strength to weight ratio is essential, said cargo roller being free of any axle housing, said cargo roller comprising:

a roller portion having an outer surface which forms a circle when viewed normal to a central axis of rotation, said roller portion having a first end and a second end, each end having means for supporting a bearing assembly centered about said central axis of rotation, and a portion of an inner volume of said roller portion within said outer surface having a hollow inner cavity and including at least one stiffening ring formed normal to said axis of rotation and said stiffening ring having an inside diameter less than an average inside diameter of said hollow inner cavity, said stiffening ring being spaced from said means for supporting a bearing assembly at each end of said roller portion.

2. The cargo roller of claim 1 wherein said stiffening ring is positioned midway between said first end and said second end.

3. The cargo roller of claim 1 wherein said stiffening ring and said roller portion are integrally formed.

4. The cargo roller of claim 3 wherein said stiffening ring is filleted in said hollow inner cavity.

5. The cargo roller of claim 3 wherein said roller portion has a bearing cavity at said first end and said second end.

6. The cargo roller of claim 5 wherein said bearing cavity at said first end and said second end has a bearing stop which has an inner edge which is filleted.

7. The cargo roller of claim 6 wherein a bearing assembly is pressed into said cavity at said first end and said cavity at said second end without the use of an intermediate hub.

8. A cargo roller assembly useful in aircraft or other applications where high strength to weight ratio is essential, said cargo roller assembly including a bearing cavity supporting a bearing at a first end, a bearing cavity supporting a bearing at a second end, and said cargo roller assembly being free of any axle housing, said cargo roller comprising:

a roller portion having a slightly crowned outer surface which forms a circle when viewed normal at any point along a central axis of rotation, said roller portion having a first end and a second end, each end having means for supporting a bearing assembly centered about said central axis of rotation and a portion of an inner volume of said roller portion within said outer surface having a hollow inner cavity and including one stiffening ring formed midway between said first end and said second end and formed normal to said axis of rotation and said stiffening ring having an inside diameter less than an average inside diameter of said hollow inner cavity, said stiffening ring being spaced from said means for supporting a bearing assembly at each end of said roller portion.

9. The cargo roller assembly of claim 8 wherein said roller portion has three areas of maximum wall thickness, one of said areas being at a mid-point between said first end and said second end, a second area being at an inner edge of said means for supporting a bearing assembly and said third area being at an inner edge of said means for supporting a bearing assembly at said second end.

10. A cargo roller for use in a roller assembly useful in aircraft or other applications where high strength to weight ratio is essential, said cargo roller comprising:

a roller portion having a slightly crowned outer surface which forms a circle when viewed normal at any point along a central axis of rotation, said roller portion having a first end and a second end, each end having means for supporting a bearing assembly centered about said central axis of rotation and a portion of an inner volume of said roller portion within said outer surface having a hollow inner cavity and including one stiffening ring formed midway between said first end and said second end and formed normal to said axis of rotation and said stiffening ring having an inside diameter less than an average inside diameter of said hollow inner cavity, said stiffening ring being spaced from said means for supporting a bearing assembly at each end of said roller portion, and wherein said hollow inner cavity has a crowned portion which follows the shape of the outer crown surface in such a manner that a wall thickness along a majority of the hollow cavity is constant.

* * * * *